United States Patent
Agirman

(10) Patent No.: US 12,492,838 B2
(45) Date of Patent: Dec. 9, 2025

(54) MOTOR IDENTIFICATION TEST

(71) Applicant: Carrier Corporation, Palm Beach Gardens, FL (US)

(72) Inventor: Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 177 days.

(21) Appl. No.: 18/389,640

(22) Filed: Dec. 19, 2023

(65) Prior Publication Data

US 2024/0210063 A1 Jun. 27, 2024

Related U.S. Application Data

(60) Provisional application No. 63/476,772, filed on Dec. 22, 2022.

(51) Int. Cl.
| | |
|---|---|
| G01R 27/26 | (2006.01) |
| F24F 11/49 | (2018.01) |
| G01R 31/34 | (2020.01) |
| H02K 11/27 | (2016.01) |
| H02P 27/04 | (2016.01) |

(52) U.S. Cl.
CPC .......... F24F 11/49 (2018.01); G01R 27/2611 (2013.01); G01R 31/34 (2013.01); H02K 11/27 (2016.01); H02P 27/04 (2013.01)

(58) Field of Classification Search
CPC ...... F24F 11/49; G01R 27/2611; G01R 31/34; G01R 31/343; H02K 11/27; H02P 27/04
See application file for complete search history.

(56) References Cited

U.S. PATENT DOCUMENTS

| | | | |
|---|---|---|---|
| 7,841,583 B1 | 11/2010 | Kureck | |
| 8,242,723 B2* | 8/2012 | Green | F24F 11/62 318/700 |
| 8,673,137 B2 | 3/2014 | Verdegan et al. | |
| 10,976,069 B2* | 4/2021 | Song | F24F 11/49 |
| 11,703,249 B2* | 7/2023 | Puranen | F24F 3/044 236/49.3 |

(Continued)

FOREIGN PATENT DOCUMENTS

| | | |
|---|---|---|
| CN | 103281035 B | 8/2016 |
| CN | 104767453 B | 4/2017 |

(Continued)

*Primary Examiner* — Vinh P Nguyen
(74) *Attorney, Agent, or Firm* — Souad Hakim

(57) ABSTRACT

A method for identifying an electric motor includes applying a first predefined current having a first frequency to a terminal of the electric motor. The method further includes calculating a first inductance value of the electric motor at the first frequency. The method includes applying a second predefined d-axis current having a second frequency to the terminal of the electric motor. The method also includes calculating a second inductance value of the electric motor at the second frequency. Further, the method includes obtaining a first deviation value and the second deviation value based on a comparison with a first reference value and a second reference value respectively. Finally, the method includes identifying the electric motor as one of an intended motor or a non-intended motor based on a comparison of each of the first deviation value and the second deviation value with a predefined threshold value.

20 Claims, 6 Drawing Sheets

(56) References Cited

U.S. PATENT DOCUMENTS

| | | | |
|---|---|---|---|
| 11,819,409 B2 * | 11/2023 | Zhang | ................ A61F 2/2457 |
| 2021/0300722 A1 | 9/2021 | Stolt et al. | |

FOREIGN PATENT DOCUMENTS

| | | | |
|---|---|---|---|
| CN | 106788034 A | 5/2017 | |
| CN | 106870343 A | 6/2017 | |
| CN | 108155843 A | 6/2018 | |
| CN | 110890855 A | 3/2020 | |
| CN | 113285647 A | 8/2021 | |
| CN | 113676086 A | 11/2021 | |
| CN | 113691183 A | 11/2021 | |
| KR | 10-0189333 B1 | 6/1999 | |
| WO | 2019227860 A1 | 12/2019 | |
| WO | 2022099861 A1 | 5/2022 | |

\* cited by examiner

MOTOR IDENTIFICATION TEST

CROSS REFERENCE TO A RELATED APPLICATION

The application claims the benefit of U.S. Provisional Application No. 63/476,772 filed Dec. 22, 2022, the contents of which are hereby incorporated in their entirety.

FIELD OF THE INVENTION

The disclosure relates to aspects of identifying an electric motor connected to a variable frequency drive.

BACKGROUND

A heating, ventilation, and air conditioning (HVAC) unit is employed to control the temperature and humidity of an enclosed space. A typical HVAC unit works on the vapour compression cycle and uses an electric motor-powered compressor to compress the refrigerant. The electric motor is generally controlled by a motor drive which regulates the power supply to the electric motor.

There might be cases, such as during repair, where the electric motor is replaced with a replacement electric motor. The replacement electric motor, in some cases, may not be an original equipment manufacturer (OEM) motor and thus may not have a configuration corresponding to the previously installed electric motor. As a result, the replacement electric motor may not operate as desired. In the worst-case scenario, the replacement motor may fail to start due to different configurations.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The disclosure relates to a technique for identifying an electric motor connected to a variable frequency drive. The technique involves calculating inductance values at different input currents having different frequencies and comparing the inductance values with stored values to determine if the electric motor is the intended motor or not.

Disclosed herein is a method for identifying a configuration of an electric motor coupled to a variable frequency drive (VFD) is disclosed. The method includes applying, via a terminal of the VFD, a first predefined d-axis current having a first frequency to a terminal of the electric motor. The method further includes calculating, using the VFD, a first inductance value of the electric motor at the first frequency. In addition, the method includes applying, via the terminal of the VFD, a second predefined d-axis current having a second frequency to the terminal of the electric motor. The method also includes calculating, using the VFD, a second inductance value of the electric motor at the second frequency. Further, the method includes obtaining a first deviation value based on a comparison of the first inductance value with a first reference value and obtaining a second deviation value based on a comparison of the second inductance value with a second reference value. Finally, the method includes identifying the electric motor as one of an intended motor or a non-intended motor based on a comparison of each of the first deviation value and the second deviation value with a predefined threshold value.

In one or more embodiments, the method includes applying, via the terminal of the VFD, a third predefined d-axis current having the first frequency to the terminal of the electric motor and calculating, using the VFD, a third inductance value at the first frequency. In addition, the method includes applying, via the terminal of the VFD, a fourth predefined d-axis current having the second frequency on the terminal of the electric motor and calculating, via the VFD, a fourth inductance value at the second frequency. Further, the method includes obtaining a third deviation value based on a comparison of the first inductance value with a third reference value and obtaining a fourth deviation value based on a comparison of the fourth inductance value with a fourth reference value. Finally, the method includes identifying the electric motor as one of the intended motor or the non-intended motor based on a comparison of each of the third deviation value and the fourth deviation value with a predefined threshold value.

In one or more embodiments, the electric motor is identified as the intended motor when each of the first deviation value, the second deviation value, the third deviation value, and the fourth deviation value is less than the predefined threshold value.

In one or more embodiments, the electric motor is identified as the non-intended motor when one of the first deviation value, the second deviation value, the third deviation value, and the fourth deviation value is greater than the predefined threshold value.

In one or more embodiments, the method includes supplying, by the VFD, electric power to the electric motor if the electric motor is identified as the intended motor.

In one or more embodiments, the method includes cutting-off the supply of the electric power to the electric motor if the electric motor is identified as the non-intended motor.

In one or more embodiments, the first frequency is 200 hertz (Hz), and the second frequency is 1000 Hz.

In one or more embodiments, the method includes aligning, using the VFD, a d-axis of the electric motor with a VFD axis of the VFD by rotating the electric motor in one of a clockwise direction or a counter-clockwise direction in a predefined sequence prior to calculating the first inductance value.

In one or more embodiments, the first predetermined current and second predetermined current are 0.5 times a rated current capacity of the electric motor and wherein the third predetermined current and fourth predetermined current are 1.5 times a rated current capacity of the electric motor.

Also disclosed herein is a variable frequency drive (VFD) configured to electrically couple to and identify an electric motor. The VFD includes a terminal configured to couple to a terminal of the electric motor and a processor coupled to a memory module. Further, the processor is configured to apply, via the terminal of the VFD, a first predefined d-axis current having a first frequency to a terminal of the electric motor and calculate a first inductance value of the electric motor at the first frequency. In addition, the processor is configured to apply, via the terminal of the VFD, a second predefined d-axis current having a second frequency to the terminal of the electric motor and calculate a second inductance value of the electric motor at the second frequency. Further, the processor is configured to obtain a first deviation value based on a comparison of the first inductance value with a first reference value and a second deviation value based on a comparison of the second inductance value with a second reference value. Finally, the processor is configured to identify the electric motor as one of an intended motor or a non-intended motor based on a comparison of each of the first deviation value and the second deviation value with a predefined threshold value.

In one or more embodiments, the processor is configured to apply, via the terminal of the VFD, a third predefined d-axis current having first frequency to the terminal of the electric motor and thereafter, the processor is configured to calculate a third inductance value at the first frequency. Further, the processor is configured to apply, via the terminal of the VFD, a fourth predefined d-axis current having the second frequency on the terminal of the electric motor and calculate a fourth inductance value at the second frequency. The processor is configured to obtain a third deviation value based on a comparison of the first inductance value with a third reference value and obtain a fourth deviation value based on a comparison of the fourth inductance value with a fourth reference value. Further, the processor is configured to identify the electric motor as one of the intended motor or the non-intended motor based on a comparison of each of the third deviation value and the fourth deviation value with a predefined threshold value.

In one or more embodiments, the electric motor is identified as the intended motor when each of the first deviation value, the second deviation value, the third deviation value, and the fourth deviation value is less than the predefined threshold value.

In one or more embodiments, the electric motor is identified as the non-intended motor when one of the first deviation value, the second deviation value, the third deviation value, and the fourth deviation value is greater than the predefined threshold value.

In one or more embodiments, the processor is configured to supply the electric power to the electric motor if the electric motor is identified as the intended motor.

In one or more embodiments, the processor is configured to cut-off the supply of electric power to the electric motor if the electric motor is identified as the non-intended motor.

In one or more embodiments, the first frequency is 200 hertz (Hz), and the second frequency is 1000 Hz.

In one or more embodiments, the processor is configured to align a d-axis of the electric motor with a VFD axis of the VFD by rotating the electric motor in one of a clockwise direction or a counter-clockwise direction in a predefined sequence prior to calculating the first inductance value.

In one or more embodiments, the first predetermined current and the second predetermined current are 0.5 times a rated current capacity of the electric motor and wherein the third predetermined current and fourth predetermined current are 1.5 times a rated current capacity of the electric motor.

In one or more embodiments, a non-transitory computer-readable medium having stored thereon computer-executable instructions which, when executed by a computer, cause the computer to execute operations to identify an electric motor coupled to a variable frequency drive (VFD). The operation includes applying, via a terminal of the VFD, a first predefined d-axis current having a first frequency to a terminal of the electric motor and calculating a first inductance value of the electric motor at the first frequency. The operation includes applying, via the terminal of the VFD, a second predefined d-axis current having a second frequency to the terminal of the electric motor and calculating a second inductance value of the electric motor at the second frequency. The operation also includes obtaining a first deviation value based on a comparison of the first inductance value with a first reference value and obtaining a second deviation value based on a comparison of the second inductance value with a second reference value. Finally, the operation includes identifying the electric motor as one of an intended motor or a non-intended motor based on a comparison of each of the first deviation value and the second deviation value with a predefined threshold value.

In some embodiments, the operations include applying, via the terminal of the VFD, a third predefined d-axis current having first frequency to the terminal of the electric motor and calculating a third inductance value at the first frequency. In addition, the operation includes applying, via the terminal of the VFD, a fourth predefined d-axis current having the second frequency on the terminal of the electric motor and calculating a fourth inductance value at the second frequency. The operation also includes obtaining a third deviation value based on a comparison of the first inductance value with a third reference value and obtaining a fourth deviation value based on a comparison of the fourth inductance value with a fourth reference value. Finally, the operation includes identifying the electric motor as one of the intended motor or the non-intended motor based on a comparison of each of the third deviation value and the fourth deviation value with a predefined threshold value.

To further clarify advantages and features of the invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1:
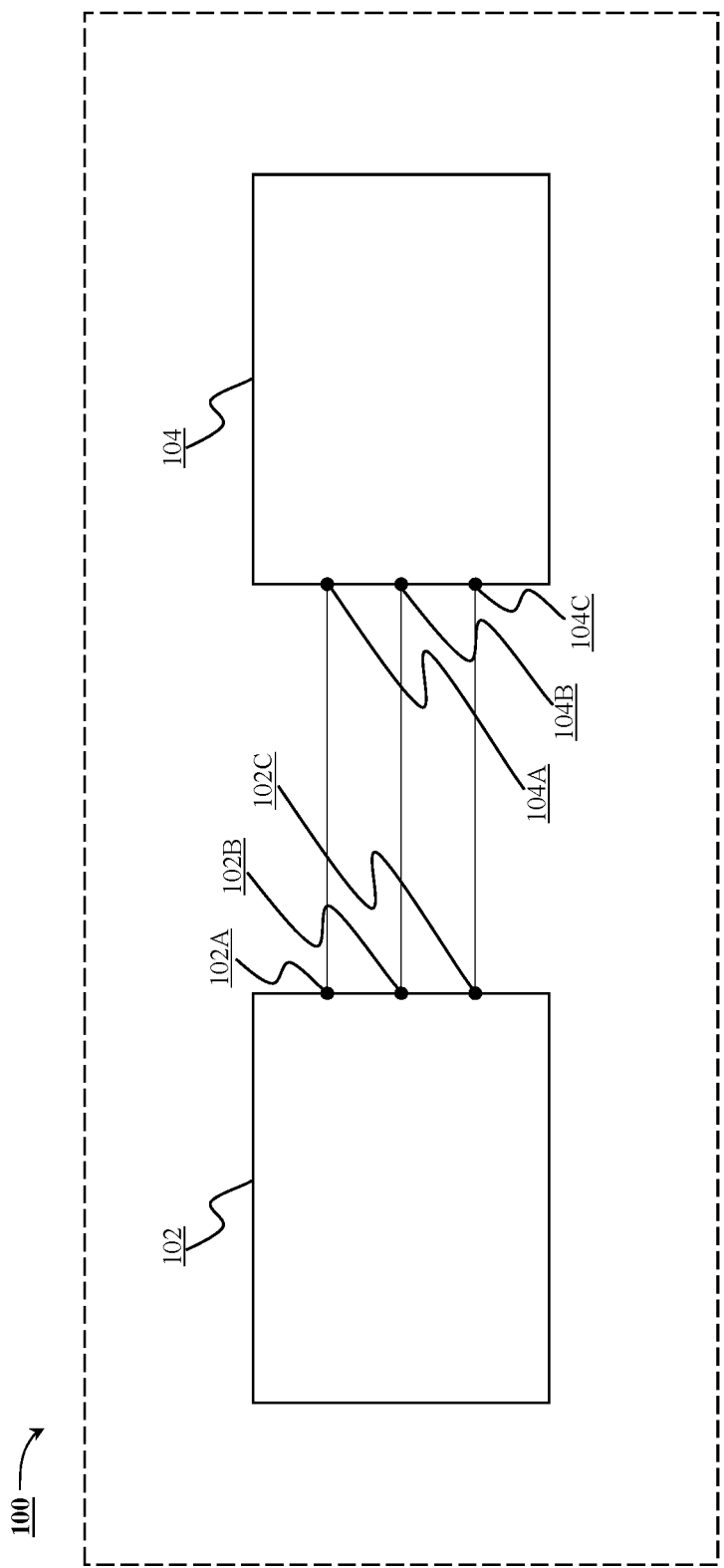
FIG. 1 illustrates a schematic view of a refrigeration system having an electric motor and a variable frequency drive.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which invention belongs. The system and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict or reduce the spirit and scope of the disclosure in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more elements is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements of the disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

Embodiments of the invention will be described below in detail with reference to the accompanying drawings.

FIG. 1 illustrates a schematic view of a refrigeration system 100 having an electric motor 102 and a variable frequency drive (VFD) 104. The electric motor 102 is configured to drive a compressor to compress a refrigerant. In one example, the electric motor 102 can be an electronically commuted motor (ECM) motor which can operate at different speeds. Further, the electric motor 102 may be a three-phase motor having terminals 102A, 102B, and 102C. Although not shown, the refrigeration system 100 may also include a condenser, an expansion valve, and an evaporator defining a fluid circuit in which the refrigerant can flow. Alternatively, the electric motor 102 can also be coupled to other loads, such as fans of the condenser or evaporator or any other load outside the refrigeration system 100.

Further, the VFD 104 is configured to vary the speed of the electric motor 102 to vary the volume of refrigerant compressed by the compressor. In other words, the VFD controls the electric motor to vary the cooling capacity of the refrigeration system 100. The VFD 104 may also have three terminals 104A, 104B, and 104C that connect to the three-phase terminals 102A, 102B, and 102C of the electric motor 102. The VFD 104 of this disclosure is configured to perform two tasks. First, the VFD 104 is configured to identify the electric motor 102 connected to the VFD 104 and second, the VFD 104 powers the electric motor 102 as per a predefined configuration. In one example, the VFD 104 may perform the identification test every time the refrigeration system 100 is switched ON.

Generally, during the course of operation of the refrigeration system 100, the electric motor 102 may develop issues that warrant its replacement with a replacement motor which may or may not conform with the predefined configuration, such as an original equipment manufacturer (OEM) configuration. The predefined configuration may include, but is not limited to, predefined inductance, and rated input current, among other examples. Further, an electric motor having the predefined configuration may be termed an intended motor whereas an electric motor having a different configuration than the predefined configuration is termed a non-intended motor.

As may be understood, an identification test is performed to check if the replacement electric motor 102 has the same configuration as the original electric motor 102. Moreover, such an identification test ensures that the VFD 104 does not operate the replacement electric motor 102 in case the replacement electric motor 102 has a different configuration than the predefined configuration thereby protecting the replacement motor 102. A detailed schematic of the VFD 104 and the manner in which the VFD 104 operates is explained below.

Figure 2:
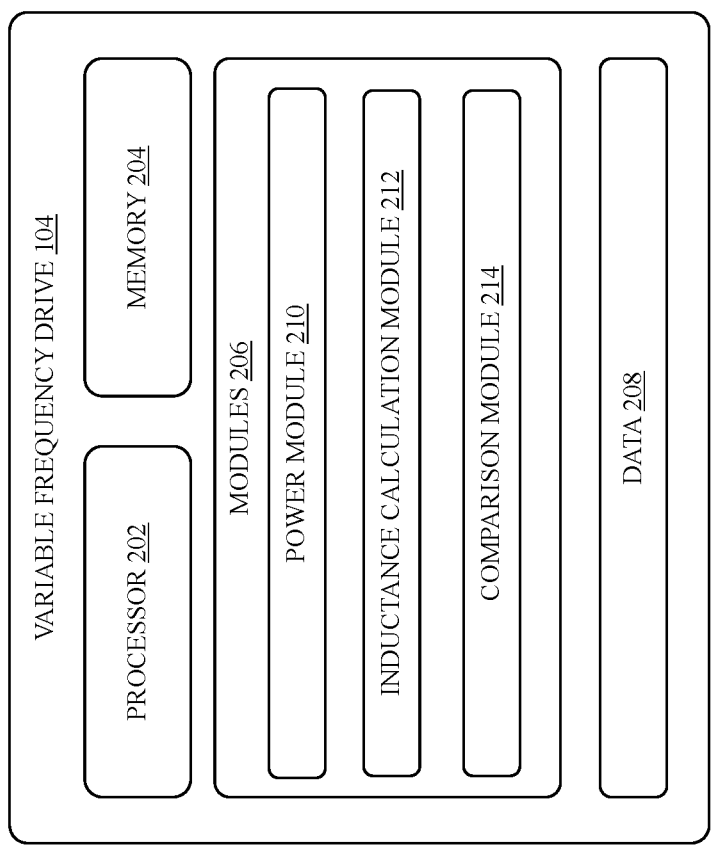
FIG. 2 illustrates a schematic view of the variable frequency drive.

FIG. 2 illustrates a detailed schematic of the VFD 104, according to an embodiment of this disclosure. The VFD 104 may include different components that operate synergistically to perform the motor identification test. For instance, the VFD 104 may include a processor 202, a memory 204, module(s) 206, and data 208. The memory 204, in one example, may store the instructions to carry out the operations of the modules 206. The modules 206 and the memory 204 may be coupled to the processor 202.

The processor 202 can be a single processing unit or several units, all of which could include multiple computing units. The processor 202 may be implemented as one or more microprocessors, microcomputers, microcontrollers, digital signal processor, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory 204, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The modules 206, amongst other things, include routines, programs, objects, components, data structures, etc., which perform particular tasks or implement data types. The modules 206 may also be implemented as, signal processor 202(s), state machine(s), logic circuitries, and/or any other device or component that manipulates signals based on operational instructions.

Further, the modules 206 can be implemented in hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor 202 which executes instructions to cause the general-purpose processor 202 to perform the predefined tasks or, the processing unit can be dedicated to performing the predefined functions. In another embodiment, the modules 206 may be machine-readable instructions (software) which, when executed by a processor 202, perform any of the described functionalities. Further, the data 208 serves, amongst other things, as a repository for storing data processed, received, and generated by one or more of the modules 206. The data 208 may include information and/or instruction to perform activities by the processor 202.

The module(s) 206 may perform different functionalities which may include, but may not be limited to, performing the identification test. Accordingly, the module(s) 206 may include a power module 210, an inductance calculation module 212, and a comparison module 214.

In one example, the power module 210 interacts with the terminals 104A, 104B, and 104C (shown in FIG. 1) to supply electric current via a terminal of the VFD 104 to a terminal of the electric motor 102 for performing the test. In one example, the power module 210 is configured to supply predefined currents at different frequencies, namely a first frequency and a second frequency. Further, a magnitude of the supplied predefined currents may be proportional to a rated current capacity of the electric motor 102 or as per the predefined configuration or both. Furthermore, the supplied electric current can be a d-axis current. In addition, the power module 210 may be configured to provide electric power via the terminals 104A, 104B, and 104C to electric motor 102 if the electric motor 102 is identified as the intended motor. In addition, the power module 210 is configured to align a d-axis with a VFD axis of the VFD 104 so that the measurement of the inductance value is without or with minimal error.

On the other hand, the inductance calculation module 212 interacts with the terminals 104A, 104B, and 104C and is configured to calculate the motor inductance of the electric motor 102. In the illustrated example, the inductance calculation module 212 is configured to calculate motor inductance each time the predefined electric current is applied to one of the terminals of the electric motor 102 (shown in FIG. 1). The inductance calculation module 212 determines different inductance values for each application of predefined electric currents.

The comparison module 214 interacts with the inductance calculation module 212 and is configured to compare the calculated inductance values with reference inductance values stored in a database inside the data 208. In one example, as a part of the comparison, the comparison module 214 obtains a difference between the calculated inductance value and the reference inductance value which is further computed as a percentage difference from the reference inductance value. This percentage difference is termed the deviation value. The comparison module 214 further compares the deviation value with a threshold value to identify the electric motor as the intended motor and the non-intended motor. In one example, the threshold value can be 2%. Accordingly, in case the deviation value is less than 2%, the electric motor 102 is identified as the intended motor whereas in case the deviation value is more than 2%, the electric motor 102 is identified as the non-intended motor.

In one example, the processor 202 is responsible to actuate on one or more modules to perform the motor identification test. In one example, the processor 202 may actuate the power module 210 to supply a set of two predetermined currents at two different frequencies and subsequently actuates the inductance calculation module 212 to calculate two inductance values. Based on the calculated inductance values, the processor 202 actuates the comparison module 214 to obtain the standard deviation values.

In addition, the processor 202 may actuate the power module 210 to supply another set of two predetermined currents at two different frequencies and subsequently actuates the inductance calculation module 212 to calculate two additional inductance values. Based on the calculated inductance values, the processor 202 actuates the comparison module 214 to obtain the standard deviation values.

The VFD 104 determines two inductance values of the electric motor 102 and compares each one of them with a corresponding reference value. Further, based on the comparison, the VFD 104 determines the electric motor 102 is the intended motor or the non-intended motor. In one example, the VFD 104 relies on matching each calculated inductance value with the corresponding reference value to mitigate errors that may occur if the identification is performed using a single inductance value. Moreover, unlike the conventional technique which relies on the inductance and resistance of the electric motor to identify the electric motor, the VFD 104 of this disclosure does not rely on the resistance of the electric motor as the resistance can vary. A manner in which the VFD 104 operates to identify the electric motor 102 is explained with respect to FIG. 3.

Figure 3:
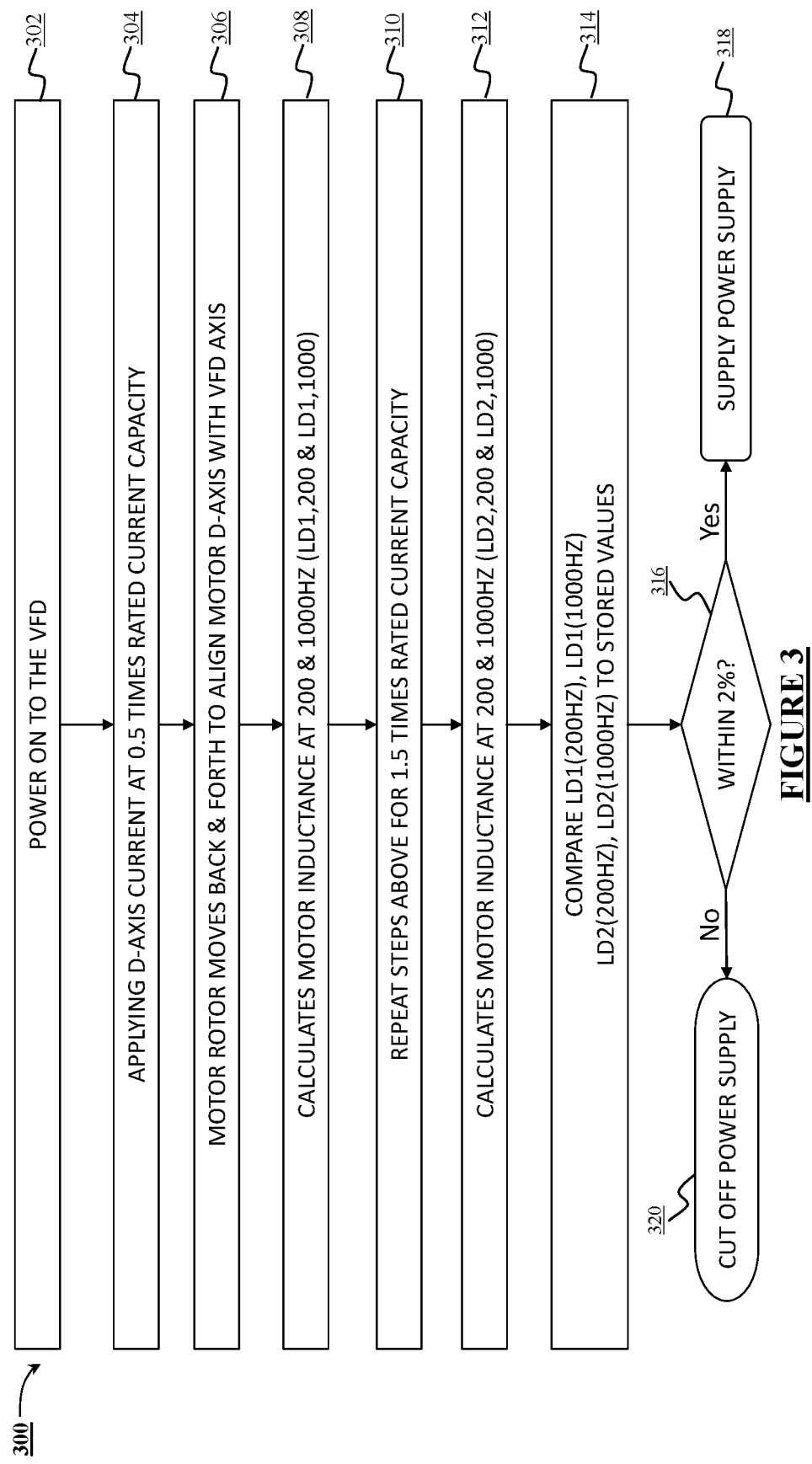
FIG. 3 illustrates a method for identifying the electric motor by determining four inductance values.

FIG. 3 illustrates a method for identifying the electric motor 102 by determining four inductance values. The order in which the method steps are described below is not intended to be construed as a limitation, and any number of the described method steps can be combined in any appropriate order to execute the method or an alternative method. Additionally, individual steps may be deleted from the method without departing from the spirit and scope of the subject matter described herein.

The method 300 can be performed by programmed computing devices, for example, based on instructions retrieved from non-transitory computer-readable media. The computer readable media can include machine-executable or computer-executable instructions to perform all or portions of the described method. The computer readable media may be, for example, digital memories, magnetic storage media, such as magnetic disks and magnetic tapes, hard drives, or optically readable data storage media.

In one example, the method 300 may be performed partially or completely by the VFD 104 shown in FIG. 1. The method begins at block 302, at which the VFD 104 is powered by a power source. At block 304, the VFD 104 provides a positive d-axis current of a value in multiples of the rated current capacity. In one example, the applied current is 0.5 times the rated current capacity of the electric motor 102. Further, at block 306, the VFD 104 rotates the electric motor 102 back and forth to align a d-axis of the electric motor 102 with a VFD axis of the VFD 104. The alignment may be performed to ensure that accurate measurement and calculation of the motor inductance can be achieved. Once the alignment is performed, the aforementioned electric current is applied sequentially at a first frequency f1 and a second frequency f2 at block 308. In one example, the first frequency f1 is 200 hz while the second frequency f2 is 1000 hz. Further, at each frequency, a first induction value Ld1(200) and a second induction value Ld1(1000) are calculated. Further, in block 310, the steps in previous blocks 302, 304, 306, and 308 are repeated at a different electric current. At block 310, the supplied electric current is 1.5 times the rated electric current of the electric motor 102. Further, at block 312, a third induction value inductance values Ld2(200) and a fourth induction value Ld2(1000) for each first frequency f1 and the second frequency f2 are calculated.

Thereafter, the inductance values Ld1(200), Ld1(1000), Ld2(200), and Ld2(1000) are compared with their corresponding stored reference values at block 314. As a part of the comparison, a difference between each inductance value Ld1(200), Ld1(1000), Ld2(200), and Ld2(1000) and the corresponding reference value is calculated. Based on the difference percentage deviation is obtained and termed as the deviation value. As may be understood, at block 314 four deviation values are obtained. Thereafter, each deviation value is compared with a threshold value at block 316. In one example, the threshold value is 2%. Based on the comparison, in instances where each of the four deviation values is within the threshold value, the VFD 104, at block 318, determines that the electric motor 102 is the intended motor and actuates to supply electric power to the electric motor 102. On the other hand, in instances where any of the deviation values is more than the threshold value, the VFD 104, at block 320, determines that the electric motor 102 is the non-intended motor and halts the supply of power.

Figure 4:
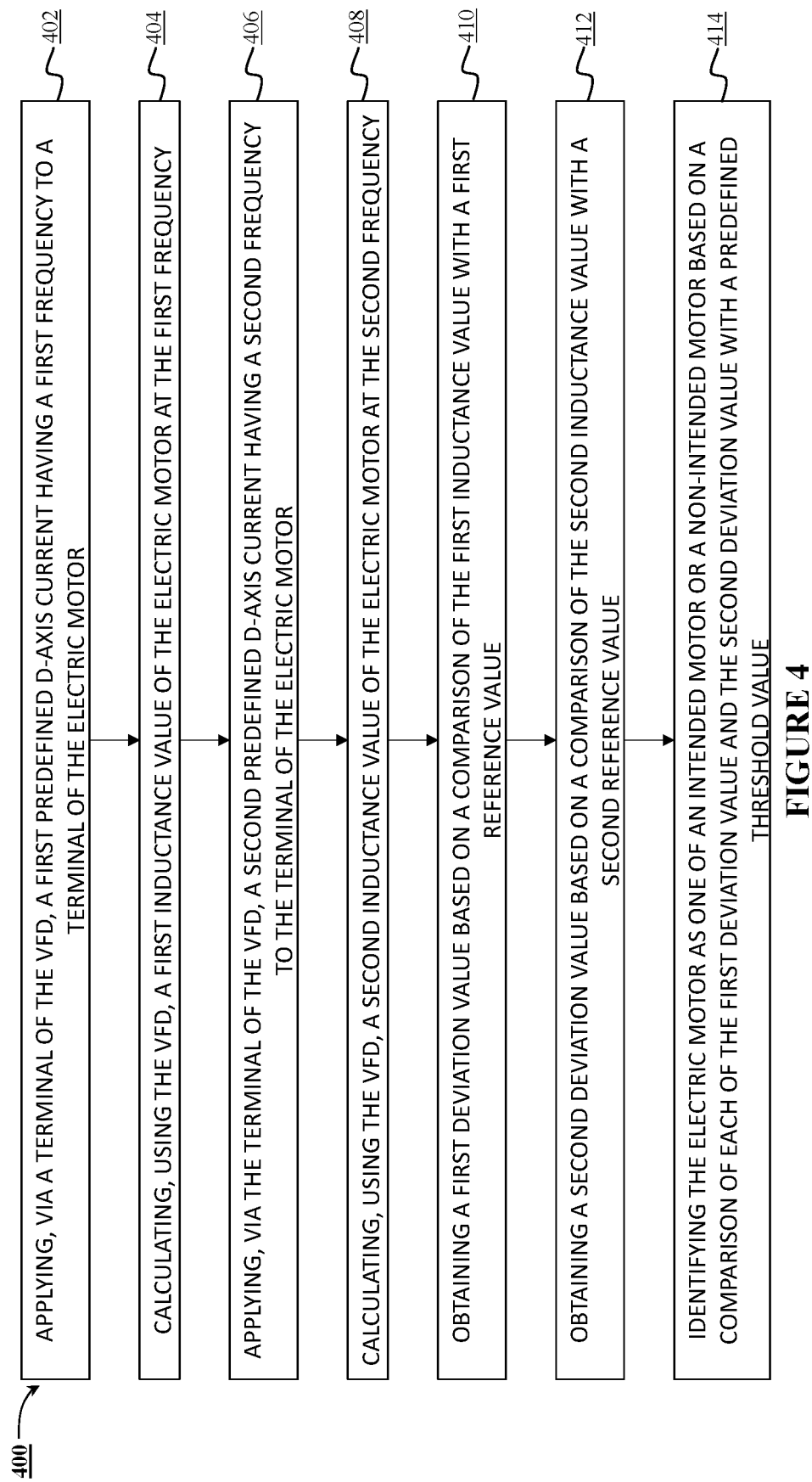
FIG. 4 illustrates a method for identifying the electric motor by calculating a first inductance value and a second inductance value.
Figure 5:
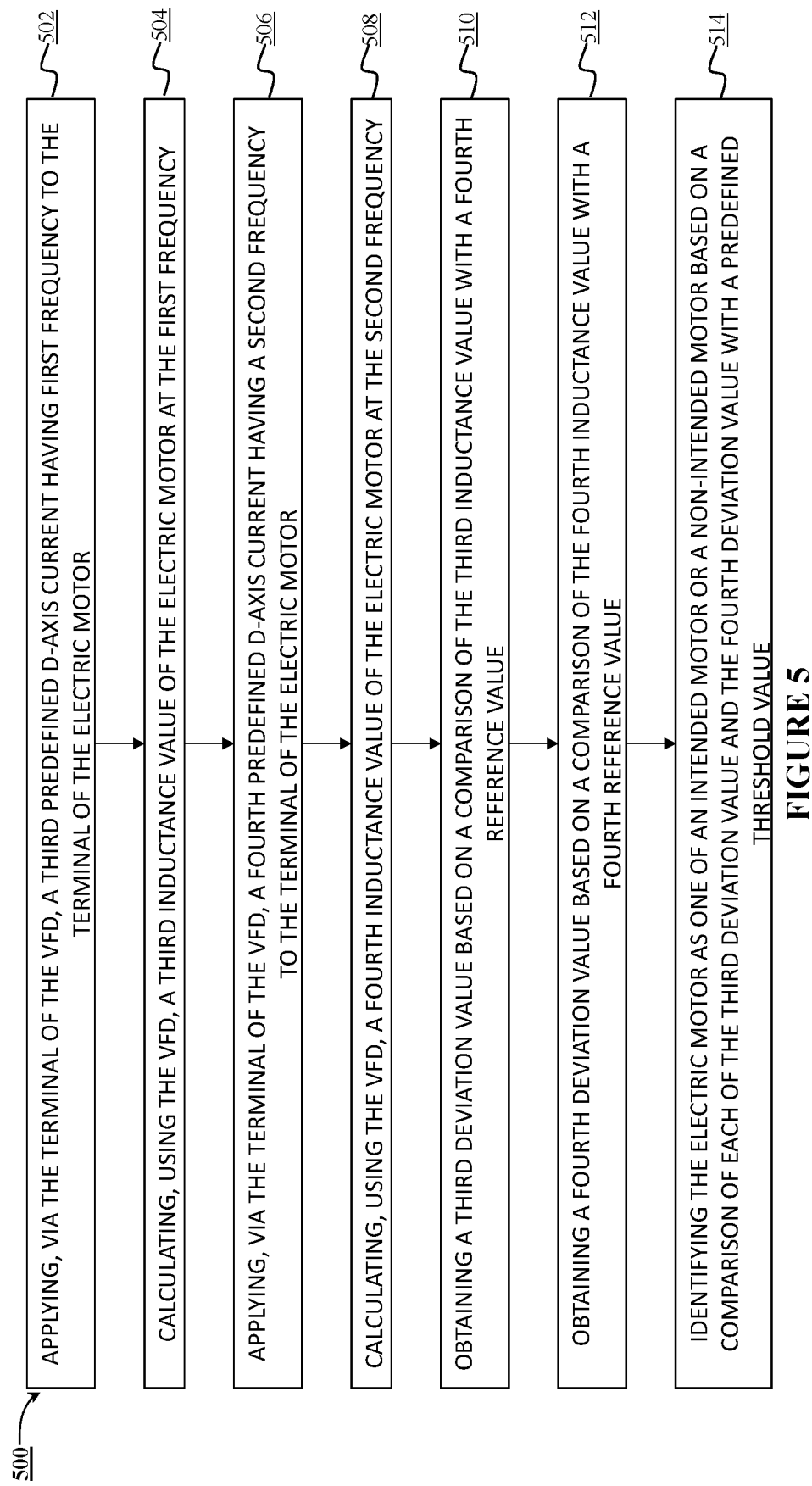
FIG. 5 illustrates a method for identifying the electric motor by calculating a third inductance value and a fourth inductance value.

A manner in which the VFD 104 executes the aforementioned method 300 to identify the electric motor 102 is explained in conjunction with FIGS. 4 and 5. Specifically, FIG. 4 illustrates a method 400 for identifying the electric motor by calculating a first inductance value and a second inductance value.

Referring now to FIG. 4, the method 400 elaborates on the step performed at blocks 304 to 308 and 314 to 316 of FIG. 3. In one example, the method 300 may be performed partially or completely by the VFD 104 shown in FIG. 2. The method 400 begins at 402 a which is a first predefined d-axis current having the first frequency f1 to a terminal of the electric motor 102 via a terminal of the VFD 104. Specifically, the processor 202 actuates the power module 210 to supply the first predetermined d-axis electric current. While supplying the first predetermined d-axis electric current, the power module 210 may also align the d-axis of the electric motor 102 with the VFD axis. Further, as a part of the alignment, the power module 210 may sequentially change the direction of flow of the first predetermined d-axis electric current in a predefined sequence to make the electric motor rotate clockwise and counter-clockwise. The power module 210 continues to rotate the electric motor 102 in the predefined sequence until the electric motor 102 is aligned with the VFD 104. Thereafter, at block 404, the inductance calculation module 212 calculates the first inductance value of the electric motor 102 and communicates the same to the comparison module 214.

At block 406, the power module 210 applies a second predefined d-axis current having the second frequency f2 to the terminal of the electric motor 102. Once applied, the inductance calculation module 212 calculates the second induction value at block 408. Once calculated, the inductance calculation module 212 relays the calculated second induction value to the comparison module 214. At block 410, the comparison module 214 obtains a first deviation value based on a comparison of the first inductance value with a first reference value stored in a database inside the data 208. Further, as part of comparison, a difference between the first inductance value with the first reference value is calculated. Further, the difference is converted to percentage deviation termed the first deviation value.

Thereafter, the comparison module 214, at block 412, obtains a second deviation value based on a comparison of the second inductance value with a second reference value stored in the database inside the data 208. Further, as part of the comparison, a difference between the second inductance value with the second reference value is calculated. Further, the difference is converted to a percentage deviation termed the second deviation value. At block 414, the comparison module 214 identifies the electric motor 102 as either the intended motor or the non-intended motor based on the comparison of each of the first deviation values and the second deviation value with a predefined threshold value. The comparison module 214 may check if the first deviation value and the second deviation are greater than the threshold value. In case anyone of the two deviation values is greater than the threshold value, the comparison module 214 may inform the power module 210 about the same and the power module 210 cuts off or blocks the supply of power to the electric motor 102. On the other hand, in case both the deviation value is less than the threshold value, the comparison module 214 may inform the power module 210 about the same and the power module 210 continues to supply the electric power to the electric motor 102 based on a load to operate the refrigeration system 100.

FIG. 5 illustrates a method 500 for identifying the electric motor by calculating a third inductance value and a fourth inductance value. The method 500 elaborates on the step performed at blocks 310 to 316 of FIG. 3. Further, the steps of the method 500 may be similar to the corresponding steps of the method 400. Specifically, at step 502, the processor 202 actuates the power module 210 to supply a third predetermined d-axis electric current having the first frequency f1. While supplying the third predetermined d-axis electric current, the power module 210 may also align the d-axis of the electric motor 102 with the VFD axis in the manner explained above. Once aligned, the inductance calculation module 212 calculates a third inductance value of the electric motor 102 and communicates the same to the comparison module 214 at block 504. Further, at block 506, the power module 210 applies a fourth predefined d-axis current having the second frequency f2 to the terminal of the electric motor 102. Once applied, the inductance calculation module 212 calculates the fourth induction value at block 508. Once calculated, the inductance calculation module 212 relays the calculated fourth induction value to the comparison module 214.

Thereafter, at block 510, the comparison module 214 obtains a third deviation value based on a comparison of the third inductance value with a third reference value stored in the database inside the data 208. Further, at block 512, the comparison module 214 obtains a fourth deviation value based on a comparison of the fourth inductance value with a fourth reference value stored in the database inside the data 208. Finally, at block 514, the comparison module 214 identifies the electric motor 102 as either the intended motor or the non-intended motor based on the comparison of each of the third deviation values and the fourth deviation value with a predefined threshold value. The manner in which the comparison module 214 identifies the electric motor 102 is the same as the process explained at block 412.

Figure 6:
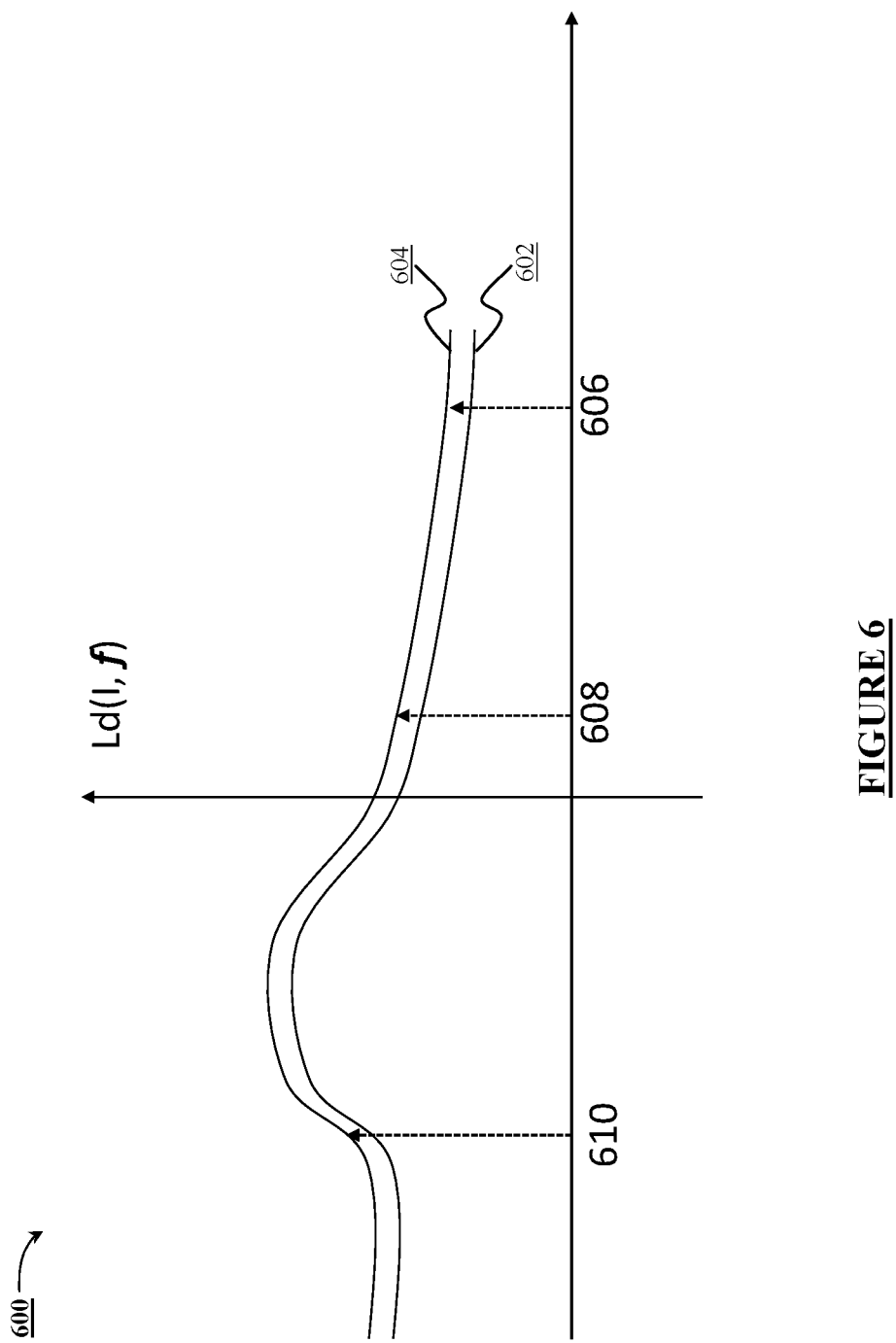
FIG. 6 illustrates a graph showing variation of electric current and change in motor inductance for the first frequency and the second frequency.

Referring now to FIG. 6 which shows a graph 600, according to an embodiment of this disclosure. The graph 600 shows a variation of electric current and change in motor inductance for the first frequency f1 and the second frequency f2. Specifically, the curve 602 shows change in the current at the first frequency f1 and the curve 604 at the second frequency f2. Further, the curve 602 indicates the values of the electric current supplied by the power module 210 that varies from a positive 1.5 times rated current 606 to positive 0.5 times rated current 608. Furthermore, the curve 602 indicates the change from the positive 0.5 times rated current to negative 1.5 times rated current 610. A similar pattern is also shown in FIG. 604. In case the electric motor 102 is the intended motor, the curve 602 and 604 will be identical.

This disclosure also relates to a non-transitory computer-readable medium having stored thereon computer-executable instructions which, when executed by a computer, cause the computer to execute operations to identify an electric motor coupled to a variable frequency drive (VFD). In one example, the instructions may be stored in the memory 204 shown in FIG. 2 and are executable by the processor 202 to execute the aforementioned modules 206. Further, the instructions, when executed cause the application of a first predefined d-axis current having a first frequency to a terminal of the electric motor and calculation of a first inductance value of the electric motor at the first frequency. The instruction also includes applying, via the terminal of the VFD, a second predefined d-axis current having a second frequency to the terminal of the electric motor and calculating a second inductance value of the electric motor at the second frequency. Further, the instructions include obtaining a first deviation value based on a comparison of the first inductance value with a first reference value and a second deviation value based on a comparison of the second inductance value with a second reference value. Finally, the instruction includes identifying the electric motor as one of an intended motor or a non-intended motor based on a comparison of each of the first deviation value and the second deviation value with a predefined threshold value.

In another aspect, the instructions may further include applying a third predefined d-axis current having the first frequency to the terminal of the electric motor via the terminal of the VFD and calculating a third inductance value at the first frequency. The instruction also includes applying a fourth predefined d-axis current having the second frequency on the terminal of the electric motor and calculating a fourth inductance value at the second frequency. The instructions also include obtaining a third deviation value based on a comparison of the third inductance value with a third reference value and obtaining a fourth deviation value based on a comparison of the fourth inductance value with a fourth reference value. Finally, the instruction includes identifying the electric motor as one of the intended motor or the non-intended motor based on a comparison of each of the third deviation value and the fourth deviation value with a predefined threshold value According to this disclosure, the VFD 104 performs the identification test every time the VFD 104 is powered. As a result, the detection and identification of the electric motor 102 occur automatically after its replacement. Moreover, the VFD 104 relies on determining and comparing the motor inductances at different current values and frequencies which ensures correct identification. In addition, the detection of a non-intended motor also prevents the operation of the electric motor for which it is not configured to operate thereby protecting the refrigeration system 100 and ensuring the operation per predefined specifications.

While specific language has been used to describe the disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for identifying a configuration of an electric motor coupled to a variable frequency drive (VFD), comprising:
   applying, via a terminal of the VFD, a first predefined d-axis current having a first frequency to a terminal of the electric motor;
   calculating, using the VFD, a first inductance value of the electric motor at the first frequency;
   applying, via the terminal of the VFD, a second predefined d-axis current having a second frequency to the terminal of the electric motor;
   calculating, using the VFD, a second inductance value of the electric motor at the second frequency;
   obtaining a first deviation value based on a comparison of the first inductance value with a first reference value;

obtaining a second deviation value based on a comparison of the second inductance value with a second reference value; and identifying the electric motor as one of an intended motor or a non-intended motor based on a comparison of each of the first deviation value and the second deviation value with a predefined threshold value.

2. The method of claim 1, further comprising:

applying, via the terminal of the VFD, a third predefined d-axis current having first frequency to the terminal of the electric motor;

calculating, via the VFD, a third inductance value at the first frequency;

applying, via the terminal of the VFD, a fourth predefined d-axis current having the second frequency on the terminal of the electric motor;

calculating, via the VFD, a fourth inductance value at the second frequency;

obtaining a third deviation value based on a comparison of the third inductance value with a third reference value;

obtaining a fourth deviation value based on a comparison of the fourth inductance value with a fourth reference value; and identifying the electric motor as one of the intended motor or the non-intended motor based on a comparison of each of the third deviation value and the fourth deviation value with a predefined threshold value.

3. The method as claimed in claim 1, wherein the electric motor is identified as the intended motor when each of the first deviation value, the second deviation value, the third deviation value, and the fourth deviation value is less than the predefined threshold value.

4. The method of claim 3, comprising:

supplying, by the VFD, electric power to the electric motor if the electric motor is identified as the intended motor.

5. The method of claim 1, wherein the electric motor is identified as the non-intended motor when one of the first deviation value, the second deviation value, the third deviation value, and the fourth deviation value is greater than the predefined threshold value.

6. The method of claim 5, comprising:

cutting-off supply of electric power to the electric motor if the electric motor is identified as the non-intended motor.

7. The method of claim 1, wherein the first frequency is 200 hertz (hz), and the second frequency is 1000 hz.

8. The method of claim 1, comprising:

aligning, using the VFD, a d-axis of the electric motor with a VFD axis of the VFD by rotating the electric motor in one of a clockwise direction or a counter-clockwise direction in a predefined sequence prior to calculating the first inductance value.

9. The method of claim 1, wherein the first predetermined current and the second predetermined current is 0.5 times a rated current capacity of the electric motor and wherein the third predetermined current and fourth predetermined current is 1.5 times a rated current capacity of the electric motor.

10. A variable frequency drive (VFD) configured to electrically couple to and identify an electric motor, the VFD comprising:

a terminal configured to couple to a terminal of the electric motor;

a processor coupled to a memory module having and configured to:

apply, via the terminal of the VFD, a first predefined d-axis current having a first frequency to a terminal of the electric motor;

calculate a first inductance value of the electric motor at the first frequency;

apply, via the terminal of the VFD, a second predefined d-axis current having a second frequency to the terminal of the electric motor;

calculate a second inductance value of the electric motor at the second frequency;

obtain a first deviation value based on a comparison of the first inductance value with a first reference value;

obtain a second deviation value based on a comparison of the second inductance value with a second reference value; and identify the electric motor as one of an intended motor or a non-intended motor based on a comparison of each of the first deviation value and the second deviation value with a predefined threshold value.

11. The VFD of claim 10, wherein the processor is configured to:

apply, via the terminal of the VFD, a third predefined d-axis current having first frequency to the terminal of the electric motor;

calculate a third inductance value at the first frequency;

apply, via the terminal of the VFD, a fourth predefined d-axis current having the second frequency on the terminal of the electric motor;

calculate a fourth inductance value at the second frequency;

obtain a third deviation value based on a comparison of the third inductance value with a third reference value;

obtain a fourth deviation value based on a comparison of the fourth inductance value with a fourth reference value; and identify the electric motor as one of the intended motor or the non-intended motor based on a comparison of each of the third deviation value and the fourth deviation value with a predefined threshold value.

12. The VFD of claim 10, wherein the electric motor is identified as the intended motor when each of the first deviation value, the second deviation value, the third deviation value, and the fourth deviation value is less than the predefined value.

13. The VFD of claim 12, wherein the processor is configured to:

supply the electric power to the electric motor if the electric motor is identified as the intended motor.

14. The VFD of claim 10, wherein the electric motor is identified as the non-intended motor when one of the first deviation value, the second deviation value, the third deviation value, and the fourth deviation value is greater than the predefined value.

15. The VFD of claim 12, wherein the processor is configured to:

cut-off supply of electric power to the electric motor if the electric motor is identified as the non-intended motor.

16. The VFD of claim 10, wherein the first frequency is 200 hertz (hz), and the second frequency is 1000 hz.

17. The VFD of claim 10, wherein the processor is configured to:

align a d-axis of the electric motor with a VFD axis of the VFD by rotating the electric motor in one of a clockwise direction or a counter-clockwise direction in a predefined sequence prior to calculating the first inductance value.

18. The VFD of claim 10, wherein the first predetermined current and the second predetermined current is 0.5 times a rated current capacity of the electric motor and wherein the third predetermined current and fourth predetermined current is 1.5 times a rated current capacity of the electric motor.

19. A non-transitory computer-readable medium having stored thereon computer-executable instructions which, when executed by a computer, cause the computer to execute operations to identify an electric motor coupled to a variable frequency drive (VFD), the operations comprising:
- applying, via a terminal of the VFD, a first predefined d-axis current having a first frequency to a terminal of the electric motor;
- calculating a first inductance value of the electric motor at the first frequency;
- applying, via the terminal of the VFD, a second predefined d-axis current having a second frequency to the terminal of the electric motor;
- calculating a second inductance value of the electric motor at the second frequency;
- obtaining a first deviation value based on a comparison of the first inductance value with a first reference value;
- obtaining a second deviation value based on a comparison of the second inductance value with a second reference value; and
- identifying the electric motor as one of an intended motor or a non-intended motor based on a comparison of each of the first deviation value and the second deviation value with a predefined threshold value.

20. The non-transitory computer-readable medium of claim 19, comprising instructions configured to:
- applying, via the terminal of the VFD, a third predefined d-axis current having first frequency to the terminal of the electric motor;
- calculating a third inductance value at the first frequency;
- applying, via the terminal of the VFD, a fourth predefined d-axis current having the second frequency on the terminal of the electric motor;
- calculating a fourth inductance value at the second frequency;
- obtaining a third deviation value based on a comparison of the third inductance value with a third reference value;
- obtaining a fourth deviation value based on a comparison of the fourth inductance value with a fourth reference value; and
- identifying the electric motor as one of the intended motor or the non-intended motor based on a comparison of each of the third deviation value and the fourth deviation value with a predefined threshold value.

* * * * *